United States Patent [19]

Proetel et al.

[11] Patent Number: 4,613,203

[45] Date of Patent: Sep. 23, 1986

[54] SECONDARY MIRROR TILTING DEVICE FOR A REFLECTING TELESCOPE

[75] Inventors: Klaus Proetel, Troisdorf; Alfred Krabbe, Gronau; Klaus Haussecker, Baiertal; Dietrich Lemke, Heidelberg; Heinrich Bellemann, Wiesenbach; Franz Flock, Walldorf, all of Fed. Rep. of Germany

[73] Assignee: Max-Planck-Gesellschaft zur Forderung der Wissenschaften

[21] Appl. No.: 482,137

[22] Filed: Apr. 5, 1983

[30] Foreign Application Priority Data

Apr. 7, 1982 [DE] Fed. Rep. of Germany ....... 3213076

[51] Int. Cl.$^4$ ............................................. G02B 26/08
[52] U.S. Cl. ........................................................ 350/6.6
[58] Field of Search ................................. 350/6.6, 537

[56] References Cited

U.S. PATENT DOCUMENTS

| | | |
|---|---|---|
| 3,814,365 | 6/1974 | Mackenzie . |
| 3,952,217 | 4/1976 | Rawlings ........................ 350/6.6 X |
| 4,039,246 | 8/1977 | Voigt .................................. 350/6.9 |
| 4,187,452 | 2/1980 | Knapp et al. .................... 350/6.6 X |
| 4,436,364 | 3/1984 | Lauer et al. ......................... 350/6.6 |

*Primary Examiner*—John K. Corbin
*Assistant Examiner*—Vincent J. Lemmo
*Attorney, Agent, or Firm*—Brumbaugh, Graves, Donohue & Raymond

[57] ABSTRACT

A secondary mirror tilting device for a reflecting telescope, particularly an infrared reflecting telescope operating at cryotemperatures, is described in which the angular momentum is compensated and the drive of the mirror takes place with a minimum of energy. The tilting amplitude and the working frequency of the tilting device are electrically controllable.

12 Claims, 11 Drawing Figures

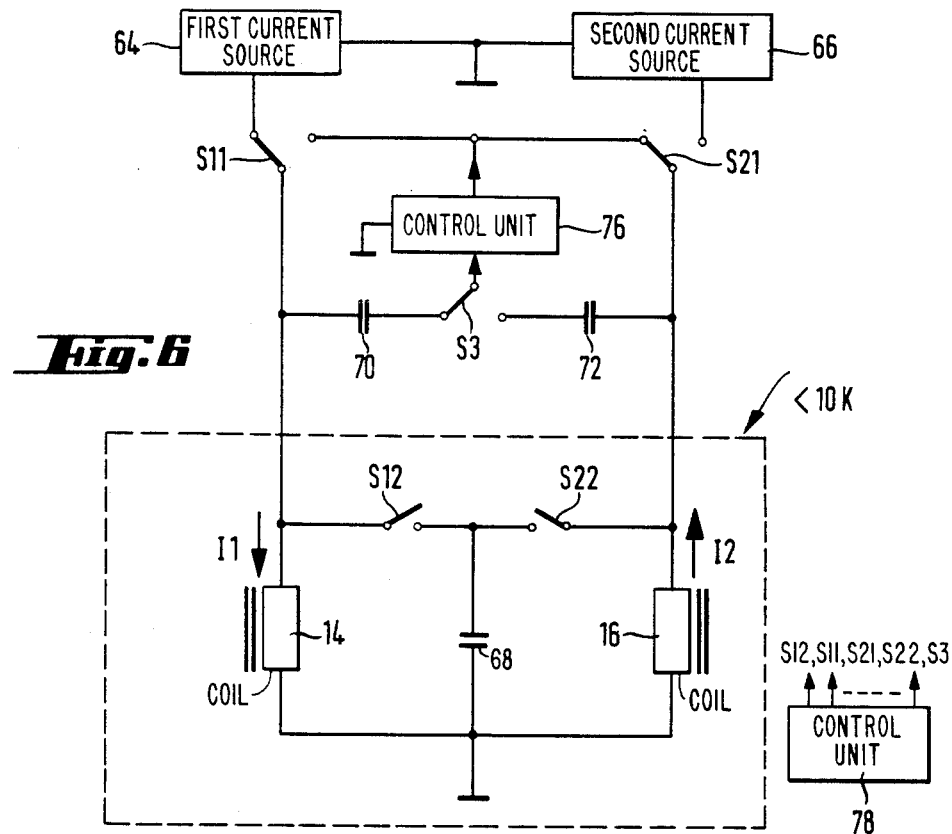
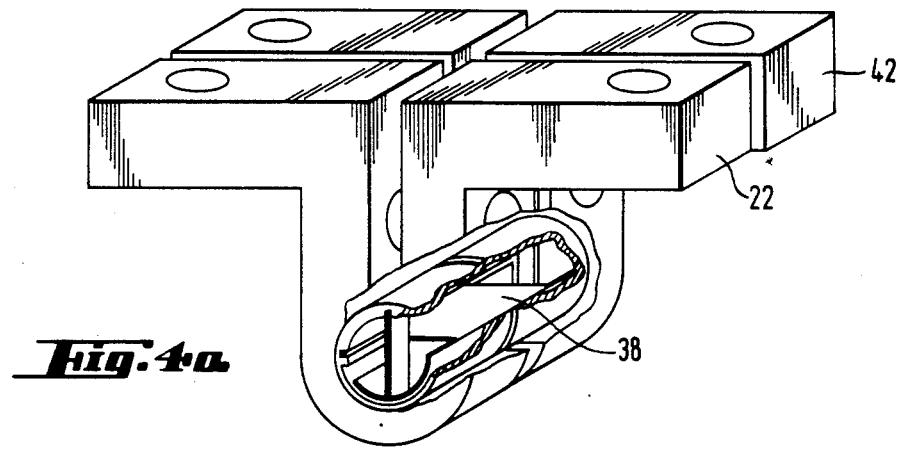

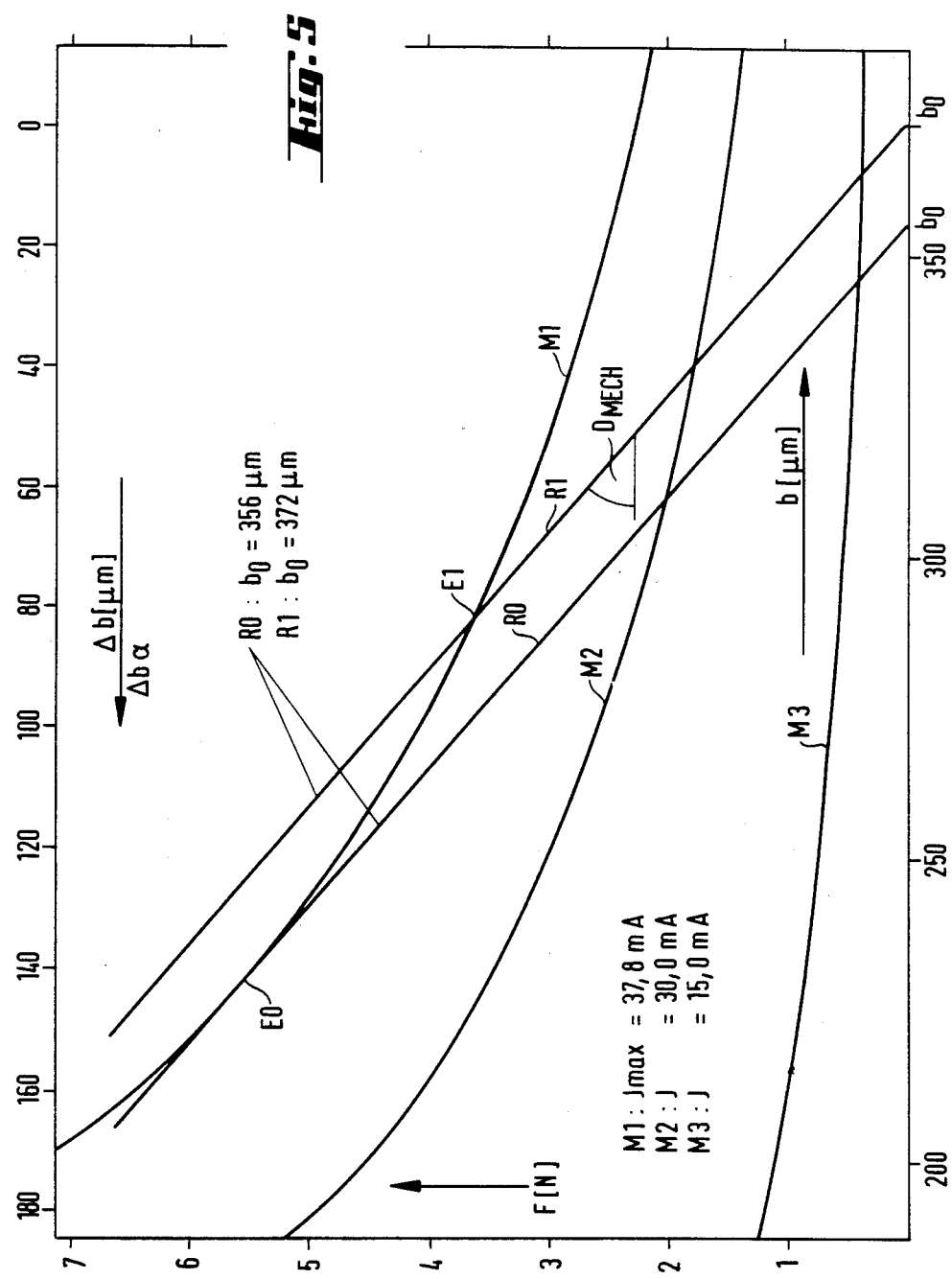

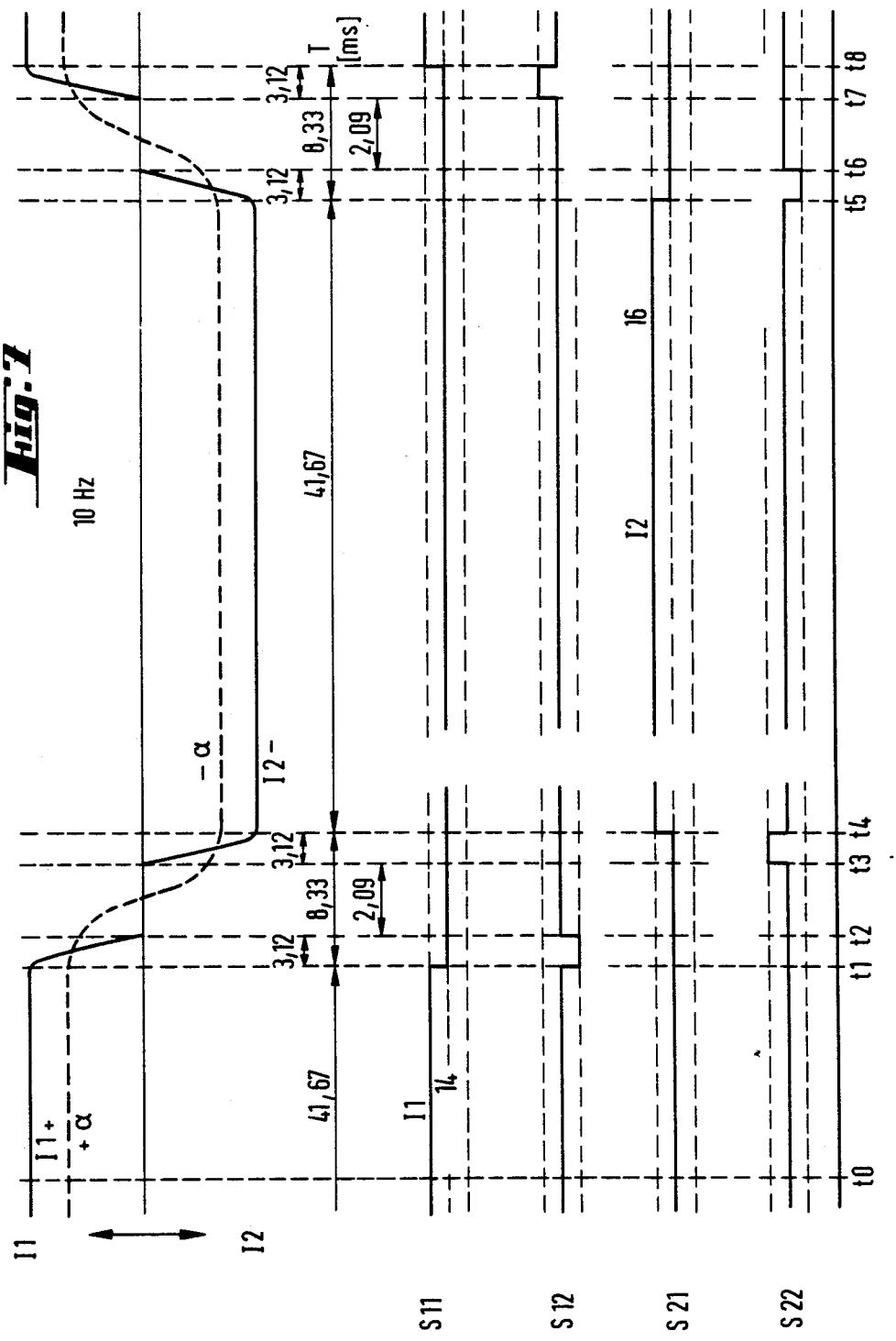

SECONDARY MIRROR TILTING DEVICE FOR A REFLECTING TELESCOPE

BACKGROUND OF THE INVENTION

The present invention relates to secondary mirror tilting devices and, more particularly, to devices for tilting the secondary mirror of a reflecting telescope which include a compensating plate and electromagnetic drive means for oscillating the mirror and the compensating plate in synchronism.

The periodic tilting or oscillation of the secondary mirror of a reflecting astronomical telescope makes it possible to reduce the effect of the background radiation of the earth's atmosphere and of the telescope components during photometric measurements as a result of the fact that the radiation from closely adjacent fields of the sky is measured differently. Preferably the secondary mirror tilting device of a reflecting telescope must operate in a vibrationless manner and should consume as little power as possible. This is especially true when the reflecting telescope is to be used for measurements in the infrared region of the spectrum and, for this purpose, must be cooled to very low temperatures such as 10° K. and when the telescope is intended for use in space. Heretofore, tilting or oscillating systems for the secondary mirror of a reflecting telescope have required more power than is desirable.

Accordingly, it is an object of the present invention to provide an angular momentum-compensated secondary mirror tilting device for a reflecting telescope, particularly for a cooled reflecting telescope to be operated in space, which consumes a miminum of power.

BRIEF SUMMARY OF THE INVENTION

In accordance with the present invention, a mirror tilting device for a reflecting telescope which has a compensating plate and electromagnetic drive means is provided with a spring arrangement which applies a restoring force to the mirror and compensating plate which increases more rapidly than the magnetic force of the electromagnetic drive means resulting from the change in spacing between the electromagnet elements and the corresponding magnetic portions of the mirror support and the compensating plate. In a preferred embodiment of the invention the mirror and compensating plate are supported on spaced axes which pass through their centers of gravity by substantially frictionless torsion spring arrangements which are disposed in recesses in the mirror support and the compensating plate, respectively, which face toward the electromagnetic drive system.

In addition, a preferred embodiment of the invention includes constant current sources which supply substantially constant current alternately to selected portions of the electromagnetic drive means to drive the mirror and compensating plate in opposed directions alternately and an energy storage capacitor connected to the electromagnetic drive means so as to store the energy generated therein by motion of the mirror support and compensating plate during the time when the corresponding portion of the electromagnetic drive means is not energized by the constant current source. The tilting device according to the invention may also include an eddy current damping arrangement associated with the mirror support and compensating plate and a cooling arrangement for cooling a portion of the heat generating elements in the current control system and the alternation of the current supply to the portions of the electromagnetic drive means is preferably related to the natural frequency of oscillation of the mirror and compensating plate system.

The secondary mirror tilting device according to the invention, as a result of the special nature of the support of the movable components and the development of the electrical control device, consumes only a minimum of electric power, so that relatively little cooling power is required, even in the case of cooling to cryotemperatures.

Among the advantageous properties of the secondary mirror tilting device according to the invention are the following:

(1) The secondary mirror and the compensating plate oscillate between the end positions only with their natural frequency (low power loss). The control of the working (position-change) frequency is achieved by different lengths of time of "holding" of the secondary mirror and of the compensating plate in the end positions.

(2) As a result of the fact that the currents are connected to the magnetic drive coils from two highly constant, rapidly switchable current sources, which are tuned to each other, and from a capacitor exactly in time, an active position measurement and control can be dispensed with.

(3) The omission of the active position measurement with a displacement gauge drastically reduces the requirements for the electrical supply lines and thus the introduction of heat into the part of the device housed in a cryostat during cooling.

(4) Through the use of an almost closed magnetic circuit with very narrow air gaps (width—corresponding to a tilting angle range of up to approximately 10 arc minutes—e.g., up to 300 microns) between the cores of the drive magnets and the yoke parts on the mirror and the compensating plate, large forces can be achieved with small electric power values, because of the great force/distance dependence of the magnetic forces (proportional to $1/x^2$).

(5) A capacitor connected symmetrically to the drive coils stores the field energy after the switching-off of the drive coils in question. In addition to the energy saving for the next switching cycle, the capacitor also causes a balancing of the two tilting phases, which is very important for practical operation.

(6) A special copper material is used for the magnetic coils, which reduces a resistance from room temperature to 4 K. by a factor of 200. As a result, the amount of the ohmic power loss in the magnetic coil system drops from, for example, approximately 340 mW at 290 K to 1.7 mW at 4 K.

(7) Through a special dimensioning of the restoring force of the spring and the magnetic drive force, mechanical stops for fixing the end positions of the mirror and of the compensating plate can be omitted, so that the disadvantages of mechanical stops of this type (rebound, wear) are eliminated. The stability of the end positions is produced by an equilibrium between mechanical elastic forces and electromagnetic forces acting in the opposite direction. This stable state can be achieved only for a limited range of air gaps.

(8) The use of torsional pivots as a support for the mirror and the compensating plate permits an extremely low-friction, wear-free operation under high vacuum and at cryotemperatures.

(9) The compensating plate and the secondary mirror are moved exactly in phase opposition. In addition, both parts are supported at their respective centers of gravity. In this way, not only a very low residual moment but also a lower drive power is achieved.

(10) The intrinsic frequency of the mechanical oscillation system containing the mirror and the compensating plate is determined by special copper-beryllium springs, whose spring constant is largely independent of temperature. As a result, the mirror has a defined zero position, even in the case of switching-off or failure of the control. The zero position and the end positions in the tilted state are independent of the operating position of the tilting device in the telescope.

BRIEF DESCRIPTION OF THE DRAWINGS

A preferred embodiment of the invention is explained in greater detail below, with reference to the drawing, in which:

FIG. 4a is a perspective representation of a preferred support for the secondary mirror or the compensating plate;

FIG. 5 is a graphic representation of the dependence of the magnetic and elastic forces on the width of an air gap in the magnetic system of the secondary mirror tilting device;

FIG. 6 is a circuit diagram of the drive system of the secondary mirror tilting device according to FIGS. 1 through 5;

FIG. 7 is a graphic representation of the course of movements and currents to which reference is made in the explanation of the mode of operation of the secondary mirror tilting device;

DETAILED DESCRIPTION OF PREFERRED EMBODIMENTS

Figure 1:
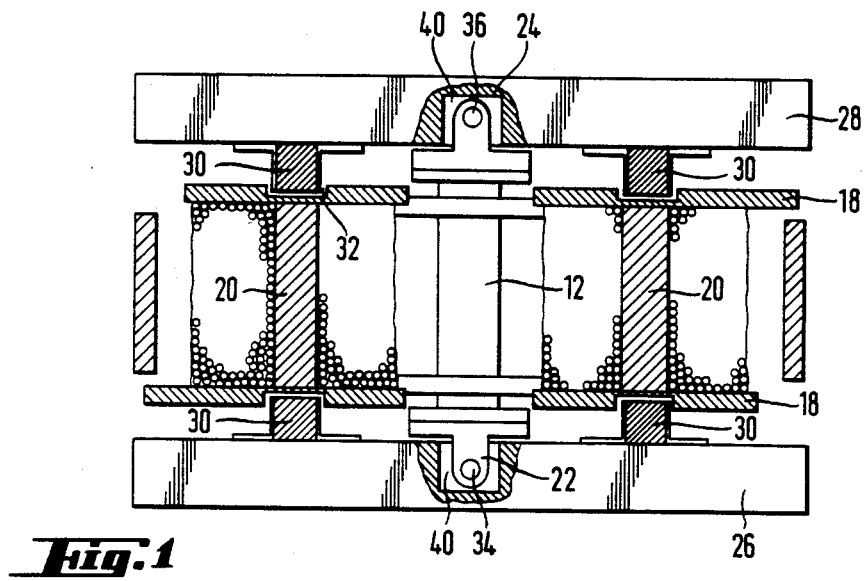
FIG. 1 represents a partially cut side view of a secondary mirror tilting device according to an embodiment of the invention.

The mechanical construction of the preferred embodiment of the invention described below can be seen from FIGS. 1 through 4. The secondary mirror tilting device contains an annular outer shell 10 in which is located a coil carrier 12, which forms the actual mounting structure (frame) of the device. Two pairs of magnetic coils, 14a, 14b and 16a, 16b are fastened to the coil carrier 12 by means of frontal end plates 18. The magnetic coils each contain a rod-shaped magnetic core 20.

In addition, mounting straps 22 and 24 are attached to opposite sides of the coil carrier 12, which serves to support a secondary mirror of a reflecting telescope 26 or a compensating plate 28 serving as a countermass to the mirror. The reflecting telescope can, for example, be a Cassegrain telescope of the Ritchey-Chrétien type.

The mirrors, including the secondary mirror 26, are preferably made of glass ceramic (Zerodur).

Figure 3:
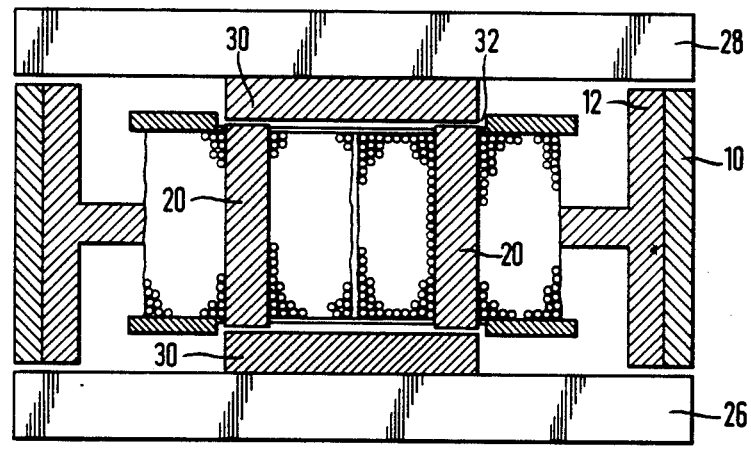
FIG. 3 represents a side view of the secondary mirror tilting device according to FIGS. 1 and 2, rotated by 90° with respect to FIG. 1.

On the sides of the secondary mirror 26 and of the compensating plate 28 facing the magnetic coils 14, 16 there are attached, e.g., cemented, armatures 30 which have the form of rods with a square cross-section and are opposite the magnetic cores 20 of a pair of magnetic coils 14a, 14b or 16a, 16b, as can be seen from FIG. 1 and FIG. 3. The end plates 18 are provided with rectangular depressions 32 opposite the armatures, into which the faces of the magnetic cores 20 can project, as shown in FIG. 3.

The secondary mirror 26 and the compensating plate 28 are supported rotatable about axes 34 and 36, respectively, which pass through the centers of gravity of the mirror-armature arrangement and compensating plate-armature arrangement, respectively. The support is provided in each case by so-called torsional pivots 38, which are supported on the mounting straps 22 and 24, as is shown in greater detail in 4a for one of the two supports of the secondary mirror. In order to make it possible for the axis of rotation to pass through the center of gravity of the secondary mirror 26 and the compensating plate 28, these structural elements are in each case provided with a groove-like recess 40, which houses the pivot support with the associated torsional pivot 38. FIG. 4a shows how the torsional pivot 38 is provided with a strap 42 for attachment to the mirror (or the compensating plate) and with the strap 22 for attachment to the coil carrier 12.

Figure 2:
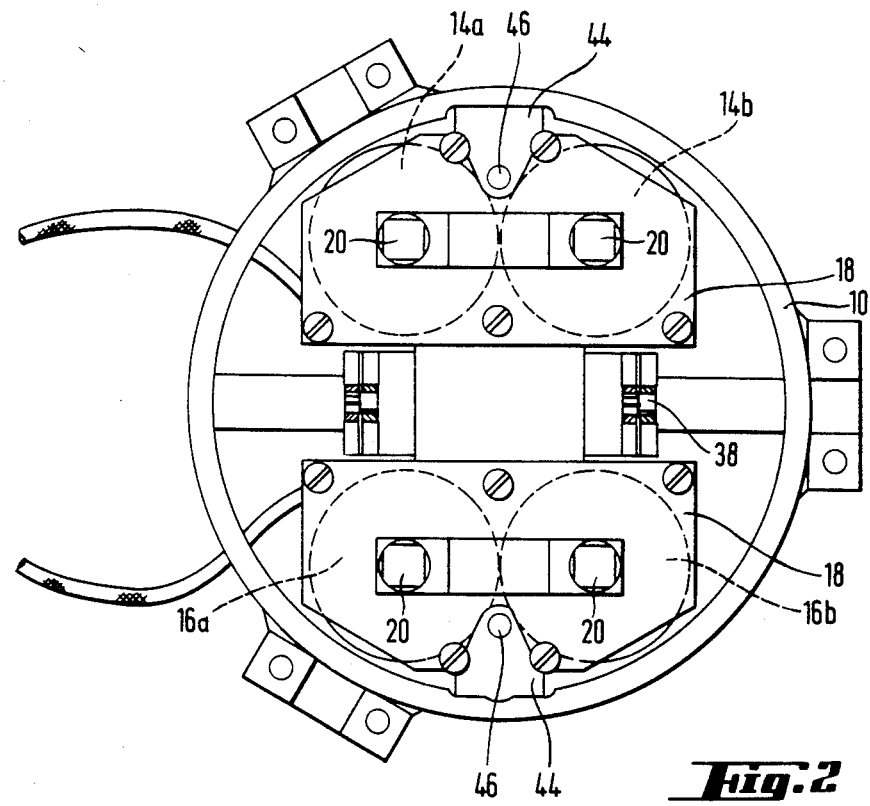
FIG. 2 represents a top view of the secondary mirror tilting device according to FIG. 1, without a compensating plate.
Figure 4B:
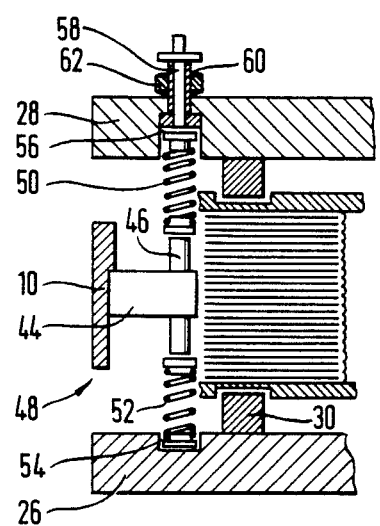
FIG. 4b is a more detailed representation of a return spring arrangement for the secondary mirror tilting device according to FIGS. 1 through 3.

As shown by FIGS. 2 and 4b, guide sleeves 44 are attached at diametrically opposite points on the outer shell 10 between the coils 14a, 14b and 16a, 16b of each pair, said sleeves containing an axial hole in which a guide pin 46 of a return spring arrangement 48 is supported in a fixed or sliding manner, or fixed for one return spring arrangement and sliding for the other. The return spring arrangement 48, which is shown in greater detail in FIG. 4b, also contains two springs 50, 52, which are located between the guide pin 46 and the compensating plate 28 and between the guide pin 46 and the secondary mirror 26, respectively. The springs 50, 52 consist of a copper-beryllium alloy, which guarantees that the spring constant is largely independent of temperature. The end of the spring 52 facing away from the guide pin 46, through a point bearing, which contains a small ball, is in contact with the bottom of a blind hole 54 in the secondary mirror 26, which surrounds the end of this spring at a distance. The end of the spring 50 facing away from the guide pin 46, through a corresponding point bearing 56, is in contact with a plate-shaped end of a spring adjusting screw 58 which, as can be seen from FIG. 4b, is screwed into a bush 60 containing an appropriate internal thread, and fastened by means of a nut 62 in a hole of the compensating plate 28, which is expanded in the direction of the spring 50. The spring adjusting screws 58 make it possible to adjust the rest portion of the secondary mirror and of the compensating plate and the restoring force produced during deflection of these structural elements from the rest position. When the guide pin is supported in a fixed manner, two adjusting screws are provided per return spring arrangement.

The simultaneous rotation of the secondary mirror 26 and of the compensating plate 28 in opposite directions is produced by alternating excitation of the pairs of coils 14a, 14b and 16a, 16b, the coils of which can always be connected in series. A preferred circuit for excitation of the pairs of coils 14, 16 is shown in FIG. 6. This circuit arrangement contains a first current source 64 connected with the first pair of coils 14 through a first change-over switch S11 and a second current source 66 connected with the second pair of coils 16 through a second change-over switch S21. The current sources 64, 66 are constant-current sources with a high internal resistance and may be desired to deliver a constant current of adjustable magnitude.

The ungrounded terminals of the pairs of coils 14, 16 can also be coupled through a switch S12 or S22, respectively, with a storage capacitor 68. The switches S12 and S22 are preferably located in a cooled part of the circuit, which part can be cooled by cooling means known in the art.

In accordance with an advantageous but not necessary development of the circuit arrangement according to FIG. 6, the ungrounded terminals of the pairs of coils 14 and 16 are also coupled by means of a coupling capacitor 70 and 72, respectively, which could also be replaced by a coupling transformer, to a fixed contact member, in each case, of a change-over switch S3, whose movable contact member is connected to the input of a control unit 76. The output of the control unit 76, as shown in FIG. 6, can be coupled with a second fixed contact member of the change-over switches S11 and S21, respectively, so that, therefore, the ungrounded terminal of the magnetic coil pairs 14 or 16 can be connected optionally to the corresponding current source 64 or 66 or to the output of the control unit 76.

The switches S11, S12, S21, S22 and S3 are preferably pulse-controlled electromechanical relays and are controlled by a control unit 78, which can contain a suitable programmed microprocessor, as will be explained below with reference to FIG. 7.

The windings of the magnetic coils 14a ... 16b preferably consist of a copper material, whose resistance decreases strongly with decreasing temperature, e.g., of 0.2-mm CuL wire made from relatively impure copper.

The maximum angle of rotation of the secondary mirror and of the compensating plate in the present device is determined by an equilibrium of the electromagnetic force $F_{el}$ of the drive coils and the mechanical counterforce $F_{me}$ of the return spring arrangement:

$$F_{el} = \frac{\mu_o N^2 I^2 A}{(l/\mu + 4(b_o - \Delta b))^2} \quad (1)$$

$$F_{me} = -D_{me} \cdot \Delta b \quad (2)$$

where $\mu_o$: Permeability constant
N: Number of coil windings
I: Coil current
A: Core cross-section, air gap cross-section
l: Length of the magnetic circuit
$\mu$: Permeability of the core material
$b_o$: Air gap at rest
$\Delta b$: Spring travel, change in the air gap during mirror deflection, and
$D_{me}$: Spring constant For a given tilting angle (given width of the air gap), a stable equilibrium is established if the following condition is met:

$$\frac{dF_{me}}{d\Delta b} - \frac{dF_{el}}{d\Delta b} - \Delta \frac{dF}{d\Delta b} \cdot \theta \quad (3)$$

These relationships are represented graphically in FIG. 5, in which the force F is plotted along the ordinate and the tilting angle (which is inversely proportional to the width of the air gap, to a first approximation) is plotted along the abscissa. The curves $M_1$, $M_2$ and $M_3$ show the course of the magnetic force as a function of the tilting angle for different driving currents; the curves R0 and R1 show the course of the mechanical spring restoring force for two different settings of the air gap at rest, with the same spring constant. A stable end position is obtained only for the air gap setting corresponding to R1 for E1, while the setting R0 for E0 does not result in a stable end position, i.e., the mirror and compensating plate, in this case, would rotate up to the stop of the armature 30 on the magnetic cores 20. In the case of the other setting, on the other hand, a stable end position is ensured without a mechanical stop, which is very advantageous for a vibrationless operation of the tilting device and also makes it possible to carry out an electrical adjustment of the mirror travel (maximum tilting angle). Another significant advantage of this type of end position fixation is the fact that no electrical displacement gauge is required to control the end position. This is because displacement gauges of this type require shielded supply lines, which form a thermal bridge to the tilting device, which is at low temperatures during operation, and thus increase the coolant requirement.

The mode of operation of the secondary mirror tilting device described above will now be explained with reference to FIGS. 6, 7, and 8, in which, for the time being, the circuit part with the coupling capacitors 70, 72, the switch S3, and the control unit 76 has been disregarded in FIG. 6.

When the switching devices S11, S12, S21, and S22 are in the position shown in FIG. 6, the first current source 64 supplies a controlled, constant current to the pair of magnetic coils 14, so that this pair of coils attracts the corresponding armatures 30. The secondary mirror 26 and the compensating plate 28 then assume the end position shown on the left of FIG. 8, which is unambiguously defined by the above-mentioned interaction of electromagnetic attractive force and mechanical spring restoring force. The conditions are as shown at t0 in FIG. 7.

Figure 8:
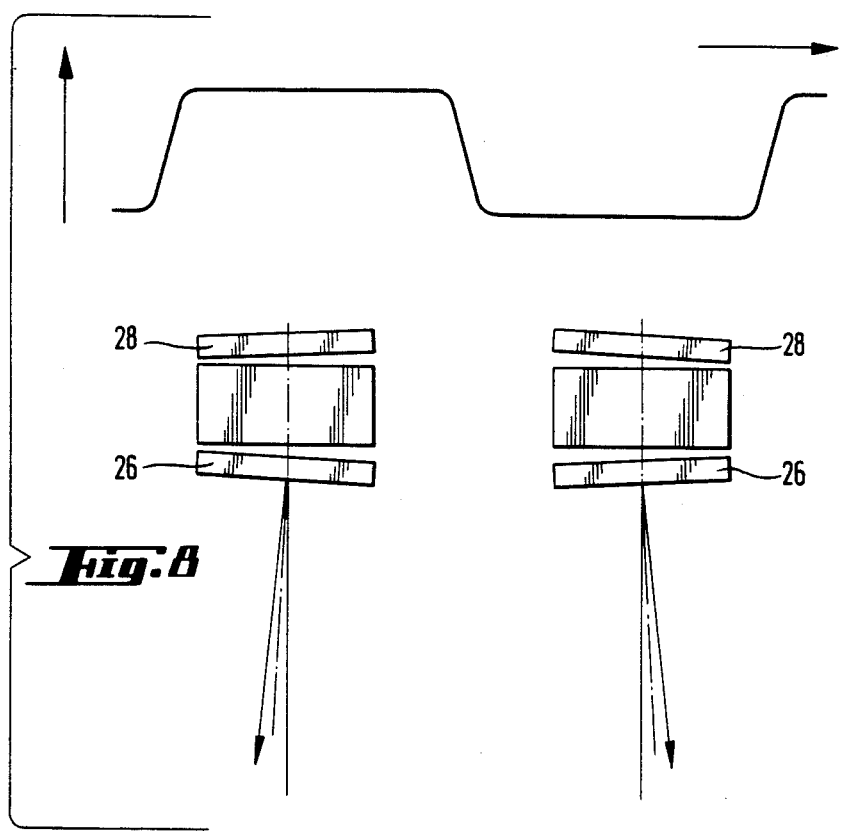
FIG. 8 is a schematic representation of the mode of operation of the secondary mirror tilting device.

If the mirror is to be tilted into the right-hand end position in FIG. 8, the connection between the coil pair 14 and the first current source 64 is broken at the time t1 by opening the switch S11. At the same time, or shortly before, the switch S12 is closed. The current induced by the breakdown of the magnetic field in the coil pair 14 can now flow through the closed switch S12 into the storage capacitor 68 and charge the capacitor 68. When the current I1 passing through the coil pair 14 during this process has dropped completely or almost to zero, the switch S12 is again opened at the time t2. Upon opening of the switch S12 at the time t1, the mirror starts to oscillate into the rest position and, beyond this, into the right-hand end position with the natural frequency determined by its torque and the restoring elastic force. Shortly before reaching the right-hand end position, the switch S22 is closed, so that the energy stored in the capacitor 68 can be discharged through the coil pair 16. The coil current I2, which is plotted downward from the zero axis in FIG. 7, thus starts to rise in the direction of its end value, which corresponds to the right-hand end position. When the mirror reaches its right-hand end position, the switch S22 is again opened and the switch S21 is closed, so that the second current source 66 now transmits a stationary "holding current" through the coil pair 16, which stabilizes the right-hand end position. If, at any later time t5, the mirror is again to be tilted into the left-hand end position, the switch S21 is opened and the switch S22 closed. The coil current I2 then decays, the magnetic energy stored in the coil pair 16 is transmitted through the closed switch S22 into the storage capacitor, and the mirror starts to execute a harmonic semioscillation into the left-hand end position. When the current I2 reaches the value zero at the time t6, the switch S22 is again opened. Shortly before reaching the left-hand end position, the switch S12 is closed at the time t7, in order to transfer the energy stored in the storage capacitor 68 to the pair of magnetic coils 14. At the time t8, the mirror reaches its left-hand end position, the switch S12 is opened and the switch S11 is closed, so that the first current source 64 now again supplies the current I1 determining the left-hand end position to the pair of magnetic coils 14.

In the describing tilting device, the change in position of the mirror proceeds with a harmonic semioscillation of the natural frequency, whereas the working frequency, i.e., the sequence of position changes, depends exclusively on the described operation of the switches S11 and S21, and can thus be changed by simple programming. The mirror travel, i.e., the tilting angle between the left-hand and right-hand end positions of the mirror can, on the other hand, be easily determined by selection of the currents I1 and I2.

The storage capacitor 68 serves not only for the utilization of the energy stored in the magnetic coils but also for the balancing of the modulation function.

Because of the extraordinarily high quality of the mechanical oscillation system containing the secondary mirror and the compensating plate, certain transient effects can appear during a position change, particularly when the working frequency of the tilting device and the natural frequency of the mechanical system are in a harmonic ratio to each other. These transient effects and other parasitic oscillations caused, for example, by vibrations can be very extensively suppressed by the control system with the components 70, 72, 76, the change-over switch S3, and the additional fixed contact members of the switches S11 and S21, as will be explained below:

Any change in position of the armature 30 with respect to the magnetic cores 20 of an excited core pair changes the width of the air gap and thus the magnetic induction, so that a corresponding change in voltage appears at the current source. For the position of the different switches shown in FIG. 6, voltage changes of this type are supplied through the coupling capacitor 70 and the change-over switch S3 to the input of the control unit 76. This control unit is preferably a PD [proportional-differential] control unit, whose output, through the switch S21, delivers a compensating current to the other coil pair 16 which damps the parasitic oscillations that had induced the input signal for the control unit. By means of this control circuit without a displacement gauge, the tilting device is damped with practically no increase in the drive power or power loss in such a way that an accuracy of the end position of 1% and better can be achieved for all frequencies.

Figure 9A:
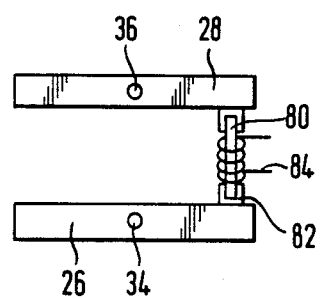
FIG. 9 is a representation of a further development of a secondary mirror tilting device according to the invention.
Figure 9B:
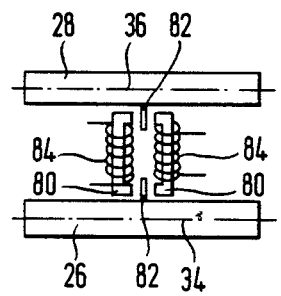

FIGS. 9a and 9b show a damping arrangement which is suitable, in particular, for the damping of small, randomly induced disturbances which, because of the high quality of the mechanical oscillation systems, decay only slowly. The damping device according to FIGS. 9a and 9b which is shown in a simplified manner in FIG. 9a in the direction of the axes of rotation 34, 36 and is shown perpendicular to these axes in FIG. 9b, operates on the principle of an eddy current brake. It contains an electromagnetic circuit with two approximately U-shaped magnetic cores 80, whose legs face each other with their faces and form two air gaps. Small copper plates 82 are arranged in a freely movable manner in the air gaps and are connected to the secondary mirror 26 or compensating plate 28. For the damping of disturbances in the end positions of the mirror and compensating plate, coils 84, which are located on the magnetic cores 82, are excited by a current which is switched on and off simultaneously with the coil currents I1 and I2 of the pairs of magnetic coils 14 and 16. The magnetic field energy of the coils 84, during switching-off of the coil current during the change of position of the mirror and compensating plate, can be temporarily stored in a capacitor, as has been described on the basis of FIG. 6, so that the power loss of the damping device according to FIGS. 9a and 9b can also be kept small.

The damping device according to FIGS. 9a and 9b preferably operates with critical damping. The logarithmic decrement of the amplitude of oscillation, the damping factor, is calculated by means of the following formula:

$$\gamma = \frac{\mu_o^2 \, N^2 \, I^2 \, D \, a^2 \, L^2}{(d + l/\mu)^2 4\rho \cdot 2\theta} \; [S^{-1}] \text{ in which:}$$

$\mu_o$: Permeability constant
$N$: Number of coil turns
$I$: Current through the coil
$D$: Total thickness of the small copper plates
$a^2$: Cross-sectional area of the core
$L$: Distance between the axis of rotation of the mirror and the point of action of the damping
$d$: Width of the total air gap
$l$: Length of the magnetic circuit
$\mu$: Permeability of the core material
$\rho$: Specific resistance of Cu
$\theta$: Moment of inertia of the mirror A practical embodiment of the secondary mirror tilting device described on the basis of FIGS. 1 through 8 showed the following characteristics:

(1) Diameter of the secondary mirror = 10 cm
(2) Working frequency range = 0–50 Hz
(3) Quasi-rectangular modulation, for example at 10 Hz with 80% end position time
(4) Tilting angle freely selectable between the end positions 0–600 arc seconds
(5) Accuracy of the end position <2%, i.e., high absolute accuracy for small tilting angles
(6) Reliable operation at cryotemperature and room temperature
(7) Reliable operation under high vacuum (space conditions)
(8) Very small thermal power loss at cryotemperatures (<5mW at 4 K.)
(9) Minimum number of cables, because displacement gauges are omitted

(10) Suppression of the angular momentum occurring during operation down to a residual moment (measured at the operating frequency) of approximately 0.002 g.cm$^{-1}$ (g=acceleration due to gravity).

The control of the chopper is designed for the production of a quasi-rectangular modulation. However, it could also produce any desired modulation functions (for example, sawtooth or delta modulation) with variable frequency and amplitude for other applications.

Instead of the two current sources described for the drive, one can also work with a current source whose polarity can not be reversed. In this way, the requirements for the accuracy of adjustment are significantly reduced (by a factor of 10), because an identity in the magnitude of the currents in both coils is ensured in advance. For this purpose, two additional switches are required, but these switch in a wattless and not time-critical manner.

The springs in the embodiment described above are held in a free support. A rigid fixation of the ends of the springs on the back of the mirror and the structure is also possible and offers some advantages in certain applications, for example, the spring pretension can be omitted and the mirror can therefore be held in a force-free manner in the resting state. This relieves the torsional pivots and prevents a mirror deformation. In addition, the mechanical hysteresis, a wear of the spring bearings, and an unnecessary damping of the mirror movement are prevented and, in addition, the temperature coupling of the mirror to the structure is improved.

The resting position of the mirror can be defined by a small adjusting spring which, because of its small force constant, makes possible a more precise adjustment of the mirror than is possible by a change in the spring pretension.

We claim:

1. A mirror tilting device for a reflecting telescope comprising mirror support means supporting a mirror for oscillation about a first axis, first armature means comprising a pair of armatures carried by the support means on opposite sides of the first axis, compensating plate means supported for oscillation about a second axis which is spaced from and parallel to the first axis, second armature means comprising a pair of armatures carried by the compensating plate means on opposite sides of the second axis, a pair of electromagnetic drive means disposed between the mirror support means and the compensating plate means including a pair of magnetic cores positioned between corresponding armatures of the first and second armature means respectively, the spacing between each magnetic core and an adjacent armature being dependent upon the relative angular position of the mirror support means and the compensating plate means, spring means interposed between the mirror support means and the compensating plate means tending to restore the mirror support means and the compensating plate means to selected angular positions, and means for supplying a substantially constant current alternately to the pair of electromagnetic drive means, wherein the spring means provides a restoring force which increases more rapidly than the force of magnetic attraction resulting from the change in spacing between the magnetic cores and the corresponding armatures as the mirror support means and the compensating plate means approach the selected angular positions.

2. A mirror tilting device according to claim 1 wherein the first and second axes pass through the center of gravity of the mirror support means and the compensating plate means, respectively.

3. A mirror tilting device according to claim 2 wherein the mirror support means and the compensating plate means are each supported by a substantially frictionless torsion spring arrangement.

4. A mirror tilting device according to claims 1, 2 or 3 wherein the mirror support means and the compensating plate means are supported by support means disposed in recesses in the mirror support means and in the compensating plate which face the electromagnetic drive means.

5. A mirror tilting device according to claims 1, 2 or 3 wherein the means for supplying substantially constant current includes first and second constant-current source means, an energy storage capacitor, switch means, and switch control means for controlling the switch means so that the first constant-current source means supplies a control current to one of the pair of electromagnetic drive means during a first period of time, the energy storage capacitor is connected in parallel with said one electromagnetic drive means during a second period of time which substantially follows the first period of time until the current flowing from said one electromagnetic drive means into the energy storage capacitor has substantially dropped to zero; the energy storage capacitor is connected in parallel with the other of the pair of electromagnetic drive means during a third period of time which has substantially the same duration as the second period of time and ends approximately one half-period of the related oscillatory system after the end of the first period of time; the second constant-current source means supplies a constant driving current to said other of the pair of electromagnetic drive means during a fourth period of time which substantially follows the third period of time; the energy storage capacitor is connected in parallel with said other electromagnetic drive means during a fifth period of time which substantially follows the fourth period of time and which is equal in duration to the second period of time; and the energy storage capacitor is connected with said one electromagnetic drive means during a sixth period of time which is equal in duration to the second period of time and ends approximately one half period of the related oscillatory system after the end of the fourth period of time.

6. A mirror tilting device according to claim 5 including means for adjusting the magnitude of the currents supplied by the constant-current source means.

7. A mirror tilting device according to claim 5 including means for controlling the duration of the first and fourth periods of time.

8. A mirror device according to claim 5 including cooling means for cooling at least a portion of the switch means and wherein the cooled portion of the switch means comprises at least one pulse-controlled electromechanical relay.

9. A mirror tilting device according to claim 1, 2 or 3 wherein the means for supplying a substantially constant current includes a current source arrangement for alternately supplying the pair of electromagnetic drive means with a substantially constant current and including control means having an input side and an output side and a switching means for coupling the input side of the control means with the electromagnetic drive means that is supplied with a constant current by the constant-current supply source arrangement and coupling the output side of the control means with the other of the pair of electromagnetic drive means, whereby the control means delivers a current to the other of the pair of electromagnetic drive means which compensates for fluctuations in the position of the mirror support means and compensating plate arrangement which cause fluctuations in voltage in the electromagnetic drive means supplied with the constant current.

10. A mirror tilting device according to claims 1, 2 or 3 including an eddy current damping means comprising eddy current brake means attached to the mirror support means and the compensating plate means and electromagnetic means interacting therewith, and current supply circuit means for the electromagnetic means arranged to supply current to the electromagnetic means when the mirror support means and the compensating plate means are in stationary, relatively tilted positions.

11. A mirror tilting device according to claim 10 wherein the current supply circuit means for the electromagnetic means comprises a storage capacitor for storage of electromagnetic energy from the electromagnetic means during changes in the relative positions of the mirror support means and compensating plate means.

12. A mirror tilting device according to claims 1, 2 or 3 wherein the frequency of alternation of the means for supplying a substantially constant current alternately to the pair of electromagnetic drive means is equal to the natural frequency of oscillation of the mirror support means, compensating plate means and spring means.

* * * * *